United States Patent
Sonoda (10) Patent No.: US 7,920,170 B2
(45) Date of Patent: Apr. 5, 2011

(54) IMAGE SENSING APPARATUS AND METHOD WHICH COMBINE A PLURALITY OF IMAGES OBTAINED FROM DIFFERENT AREAS AT DIFFERENT TIME INTERVALS

(75) Inventor: Hiroto Sonoda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 417 days.

(21) Appl. No.: 12/046,951

(22) Filed: Mar. 12, 2008

(65) Prior Publication Data

US 2008/0226170 A1    Sep. 18, 2008

(30) Foreign Application Priority Data

Mar. 15, 2007  (JP) ................................ 2007-067595

(51) Int. Cl.
    *H04N 5/225* (2006.01)
(52) U.S. Cl. ..................................... 348/220.1; 348/143
(58) Field of Classification Search .................. 382/173; 348/218.1, 220.1, 222.1, 143, 153–155
    See application file for complete search history.

(56) References Cited

U.S. PATENT DOCUMENTS 7,701,485 B2 * 4/2010 Nishizawa ............... 348/208.13
2005/0219642 A1 * 10/2005 Yachida et al. ............... 358/448

FOREIGN PATENT DOCUMENTS

JP    2003-319262    11/2003
JP    2006-060496    3/2006

OTHER PUBLICATIONS

Ulrich Muehlmann, et al. ("A New High-Speed CMOS Camera for Real-Time Tracking Applications", IEEE International Conference on Robotic & Automation, Apr. 2004).

* cited by examiner

Primary Examiner — Nelson D. Hernández Hernández
(74) Attorney, Agent, or Firm — Cowan, Liebowitz & Latman, P.C.

(57) ABSTRACT

An image sensing apparatus has first and second image sensors is provided. In the image sensing apparatus, an optical system forms an optical image on the first and second image sensors; an area-of-interest extracting unit extracts an area of interest from image data output by the second image sensor; an area-of-interest information storage unit stores area-of-interest information indicative of a pixel area in the first image sensor corresponding to the position of the area of interest; a first storage unit stores image data from an entire pixel area of the first image sensor at a time interval; a second storage unit stores image data from the pixel area of the first image sensor indicated by the area-of-interest information, at a shorter time interval; and a combining unit combines the image data stored in the first and second storage units to generate combined image data.

5 Claims, 8 Drawing Sheets

IMAGE SENSING APPARATUS AND METHOD WHICH COMBINE A PLURALITY OF IMAGES OBTAINED FROM DIFFERENT AREAS AT DIFFERENT TIME INTERVALS

BACKGROUND OF THE INVENTION

1. Field of the Invention

The present invention relates to an image sensing apparatus having two image sensors, and to an image sensing method.

2. Description of the Related Art

CCD image sensors and CMOS image sensors are widely known and used as solid-state image sensors comprising a semiconductor. A CCD image sensor functions to convert light to signal charge using photoelectric converters placed within pixels, read the signal charge out of all pixels simultaneously and transfer the charge, then convert the transferred signal charge to an electric signal and output the signal as a video signal.

A CMOS image sensor, on the other hand, functions to convert light to signal charge using photoelectric converters placed within pixels, amplify the signal charge pixel by pixel and output the result as a video signal.

Recent consumer-oriented CMOS image sensors have a much higher read-out speed in comparison with CCD image sensors of the same kind. For example, with a prototype image sensing apparatus having a CMOS image sensor, one frame consisting of 6,400,000 pixels can be output 60 times in one second, or one frame consisting of 2,760,000 pixels can be output 180 times in one second. This is disclosed by, e.g., Satoshi Yoshihara ("A 1/1.8" 6.4M Pixel, 60 Frames/s CMOS Image Sensor with Seamless Mode Change", IEEE International Solid-State Circuits Conference, February 2006). In accordance with a CMOS image sensor having this function, image sensing with a very large number of pixels at a high frame rate is possible. Accordingly, one frame of an image constituting a moving picture can be provided with the resolution necessary for a still image, and it is possible for the moving picture and still image to be read out seamlessly with no change in the state of resolution.

Again, unlike a CCD image sensor in which image signals from all pixels are read out simultaneously, the CMOS image sensor has a random-access function, i.e., a partial read-out function, in which only some of the pixels in the image sensor are read out partially. For example, in the field of robot vision and vision chips, research is being conducted concerning high-speed vision systems in which the random-access function, namely the partial read-out function, is exploited by taking advantage of the high-speed read-out function and random-access function of the CMOS image sensor. This is disclosed in the specification of Japanese Patent Laid-Open No. 2003-319262 and in Ulrich Muehlmann, et al. ("A New High-Speed CMOS Camera for Real-Time Tracking Applications", IEEE International Conference on Robotic & amp; Automation, April 2004).

In robot vision, a high spatial resolution and an excellent real-time property are both required in many instances. In this case, on the premise that all pixel information generally will not be necessary for computing an image feature quantity, only the image signal of an area of interest being observed in a frame image is read out, and an area of interest that will be observed in the next frame is updated based upon the information that has been read out. This technique is called an "intelligent pixel-selection function". Further, in the field of consumer cameras as well, it has been proposed to exploit the random-access function and make the resolution of the image data in an area of interest differ from the resolution of the image data in a peripheral area which is an area other than the area of interest in a frame image. That is, the specification of Japanese Patent Laid-Open No. 2006-60496 discloses reducing the amount of processing and processing time of a moving picture per frame image by treating an area of interest as a high-resolution area and the peripheral area as a low-resolution area.

However, in a case where a large quantity of moving images are dealt with in an image sensing apparatus having an image sensor capable of such high-speed read-out, the higher the sophistication of a task, the more difficult it is to achieve real-time (high-speed) processing consistent with the performance of the image sensor. Furthermore, there is an increase in the cost of the image sensor. In order to process image data at high speed in real-time, reducing the amount of information in the image data is desirable. However, this results in loss of spatial resolution and a decline in information in detailed portions of the image data.

SUMMARY OF THE INVENTION

The present invention has been made in consideration of the above situation, and its object is to provide an image sensing apparatus having two image sensors and both a high spatial resolution and excellent real-time property.

According to the present invention, the foregoing object is attained by providing an image sensing apparatus having first and second image sensors, comprising:

an optical system configured to form an optical image on the first and second image sensors;

an area-of-interest extracting unit configured to extract an area of interest from image data that is output by the second image sensor;

an area-of-interest information storage unit configured to store area-of-interest information indicative of a pixel area in the first image sensor corresponding to the position of the area of interest extracted by the area-of-interest extracting unit;

a first storage unit configured to store image data that is read out from an entire pixel area of the first image sensor at a first time interval;

a second storage unit configured to store image data obtained by reading out only the pixel area of the first image sensor indicated by the area-of-interest information stored in the area-of-interest information storage unit, at a second time interval shorter than the first time interval; and a combining unit configured to combine the image data that has been stored in the first storage unit and the image data that has been stored in the second storage unit to thereby generate combined image data.

According to the present invention, the foregoing object is attained by providing an image sensing method of an image sensing apparatus having first and second image sensors and an optical system for forming an optical image on the first and second image sensors, the method comprising:

an area-of-interest extracting step of extracting an area of interest from image data that is output by the second image sensor;

an area-of-interest information storage step of storing area-of-interest information indicative of a pixel area in the first image sensor corresponding to the position of the area of interest extracted in the area-of-interest extracting step;

a first storage step of storing image data, which is read out from an entire pixel area of the first image sensor at a first time interval, in a first storage unit;

a second storage step of storing image data in a second storage unit, the image data being obtained by reading out only the pixel area of the first image sensor indicated by the area-of-interest information stored in the area-of-interest information storage step, at a second time interval shorter than the first time interval; and a combining step of combining the image data that has been stored in the first storage unit and the image data that has been stored in the second storage unit to thereby generate combined image data.

Further features of the present invention will become apparent from the following description of exemplary embodiments (with reference to the attached drawings).

DESCRIPTION OF THE EMBODIMENTS

Preferred embodiments of the present invention will be described in detail in accordance with the accompanying drawings.

Figure 1:
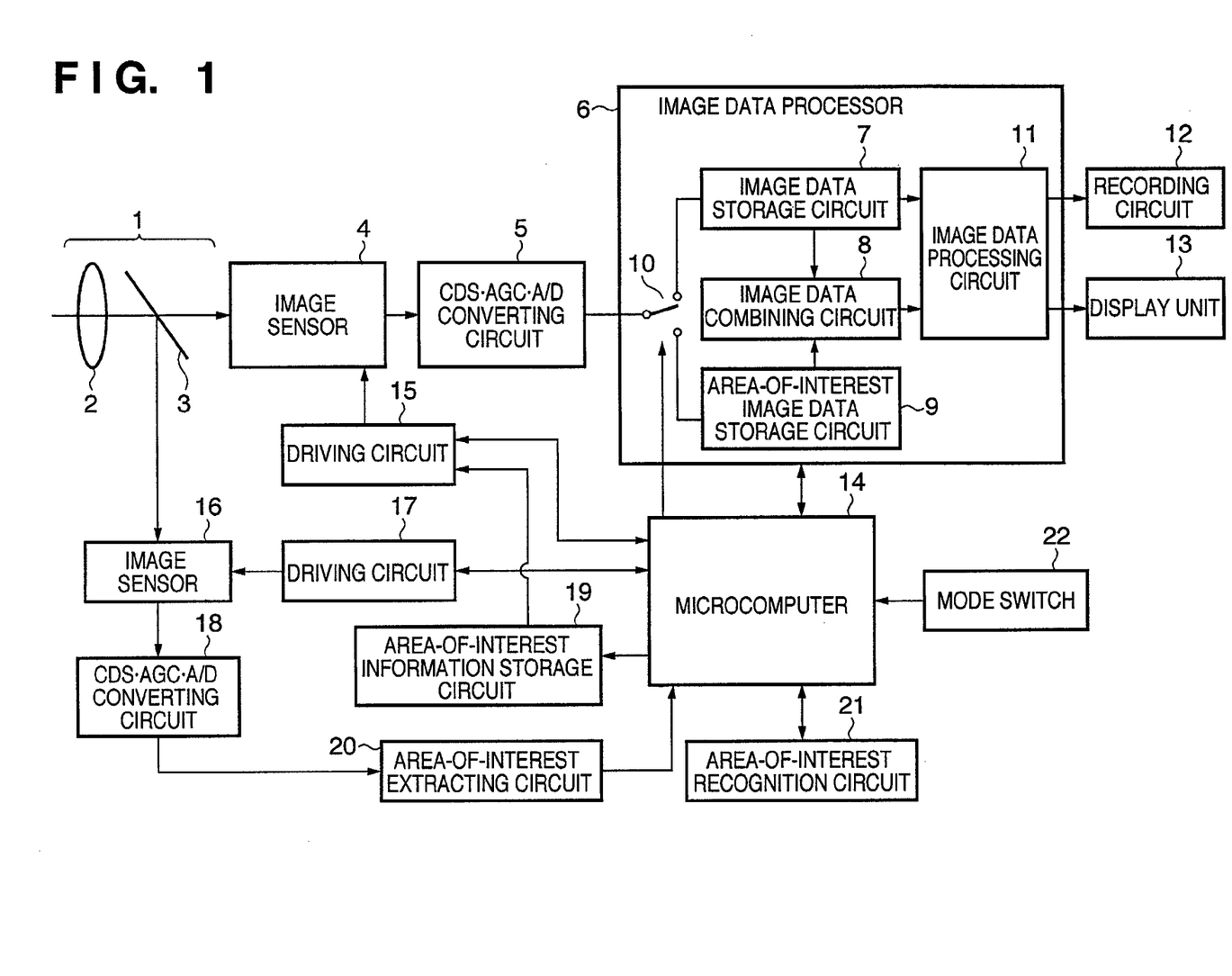
FIG. 1 is a block diagram illustrating an image sensing apparatus according to first and second embodiments of the present invention.
Figure 2:
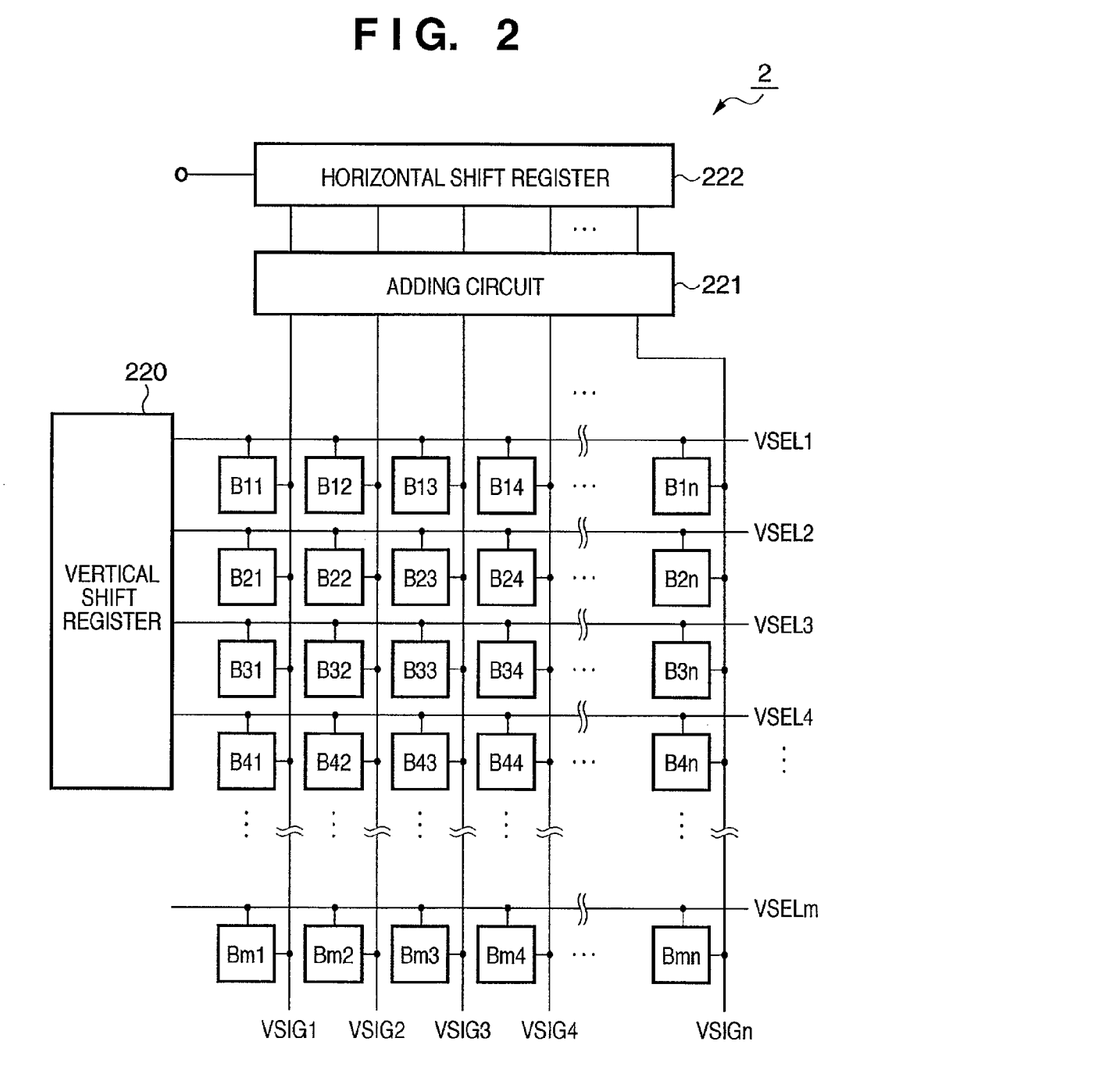
FIG. 2 is a schematic diagram illustrating a randomly accessible two-dimensional image sensor used in the image sensing apparatus according to the first and second embodiments.

FIG. 1 is a functional block diagram illustrating an image sensing apparatus according to embodiments of the present invention, and FIG. 2 is a schematic diagram illustrating the structure of a randomly accessible two-dimensional image sensor used in the image sensing apparatus according to the embodiments of the present invention.

As illustrated FIG. 1, an optical system 1 is provided between a subject and an image sensor 4 and includes a lens group 2 for forming the optical image (a moving image) of the subject on the image sensor 4. It should be noted that the lens group 2 is illustrated in the form of a single lens for the sake of simplicity. Further, it is required that the optical system 1 form the optical image (moving image) of the subject on an image sensor 16 (described later) as well. A beam splitter 3, for example, is included for this reason. Basically, however, as long as the same optical image (moving image) can be formed on the image sensor 4 and image sensor 16, it is also possible to provide a lens group that is separate from the lens group 2 of image sensor 4.

The image sensor 4 is a two-dimensional image sensor capable of high-speed read-out and random access, i.e., partial read-out. An example of such image sensor is a CMOS image sensor. The image sensor 4 is provided within a package, not shown. The image sensor 4, which is a semiconductor device having a photoelectric conversion function, converts electric charge conforming to a scene, i.e., optical image, of a moving image which has been formed by the optical system 1, to an electric signal (an analog signal) and outputs the signal.

A CDS•AGC•A/D converting circuit 5 is connected to the image sensor 4 and receives the electric signal (analog signal) from the image sensor 4. The CDS•AGC•A/D converting circuit 5 applies CDS processing to the analog electric signal, amplifies the signal, which has undergone CDS processing, by an AGC operation and finally converts the analog electric signal to image data (a digital signal).

An image data processor 6 is connected to the CDS•AGC•A/D converting circuit 5, a microcomputer 14, a recording circuit 12 and a display unit 13. As a result, the image data processor 6 receives the image data from the CDS•AGC•A/D converting circuit 5, processes the image data based upon a control signal from the microcomputer 14 and supplies the processed image data to the display unit 13 to display the image. When necessary, the image data is recorded on a removable recording medium by the recording circuit 12, although this is not illustrated.

The image data processor 6 comprises an image data storage circuit 7, an image data combining circuit 8, an area-of-interest image data storage circuit 9, a switch 10 and an image data processing circuit 11.

The image data storage circuit 7 stores one frame of image data, which has been obtained from the CDS•AGC•A/D converting circuit 5, when the entire pixel area is read out of the image sensor 4 by control exercised by a driving circuit 15 for driving this image sensor. The stored frame of image data is updated when the next frame of image data is input.

The stored frame image becomes background image data for generating one frame image together with image data of the area of interest partially read out (randomly accessed) from the image sensor 4.

In a case where the combining of image data is unnecessary (i.e., in case of the ordinary read-out mode), the one frame of image data that has been stored in the image data storage circuit 7 is input as is to the image data processing circuit 11. However, if combining of image data is necessary, the one frame of image data that has been stored in the image data storage circuit 7 is input to the image data combining circuit 8. Accordingly, the function of the image data combining circuit 8 is not used (see step S102 below) in the case of the operation for reading out the entire pixel area, which is the operation in the ordinary read-out mode, in the image sensor 4.

The image data combining circuit 8 adopts the one frame of image data, which has been stored in the image data storage circuit 7, as image data of the background. The image data combining circuit 8 then aligns the position of the area-of-interest image data, which has been stored in the area-of-interest image data storage circuit 9, in the one frame of image data that has been stored in the image data storage circuit 7, then synthesizes these two kinds of image data, thereby generating one frame of a synthesized image. This is executed by changing over the switch 10 under the control of the microcomputer 14.

More specifically, for the area-of-interest image data that has been stored in the area-of-interest image data storage circuit 9, area-of-interest information, which is information on position in the frame (i.e., background) image, has been stored in an area-of-interest information storage circuit 19. Accordingly, alignment of the aforesaid two kinds of image data is performed by controlling the switch 10 on the basis of this area-of-interest information, thereby one frame of synthesized image data is generated. The generated image data is input to the image data processing circuit 11.

The area-of-interest image data storage circuit 9 stores area-of-interest image data that has been partially read out of (randomly accessed from) the image sensor 4. The area-of-interest image data that will be input to the area-of-interest image data storage circuit 9 is only area-of-interest image data in which a specific subject has been extracted and, hence, one frame of image data cannot be generated only from the area-of-interest image data. Therefore, the area-of-interest image data is input to the image data combining circuit 8 and synthesized with the one frame of image data stored in the image data storage circuit 7, thereby generating one completed frame of image data.

The image data processing circuit 11 subjects the image data to image processing such as an aperture correction, WB correction and γ correction and outputs the processed image data to the recording circuit 12 or display unit 13. The recording circuit 12 records the image data, output from the image data processing circuit 11, on a removable medium such as a semiconductor memory, and the display unit 13 displays the image data that has been output from the image data processing circuit 11.

The driving circuit 15 is connected to the microcomputer 14 in order to drive the image sensor 4. Hence, the driving circuit 15 drives the image sensor 4 based upon a control signal received from the microcomputer 14. Specifically, the driving circuit 15 generates driving pulses, which are for driving the image sensor 4, and supplies the pulses to the image sensor 4.

FIG. 2 is a schematic diagram illustrating the structure of the randomly accessible two-dimensional image sensor 4 such as a CMOS sensor. The image sensor 4 has pixels B11 to Bmn (where m and n are integers here and below) arrayed two-dimensionally on an imaging surface on which an optical image is formed. At least a photoelectric converter and a transistor are disposed at each pixel. The transistor amplifies and outputs, on a per-pixel basis, signal charge obtained by the conversion performed by the photoelectric converter. The photoelectric converters and transistors are not shown.

A vertical shift register 220 outputs control pulses for reading an electric signal out of pixels for every horizontal output line VSEL1 to VSELm. The electric signals of each of the pixels selected by the horizontal output lines VSEL1 to VSELm are read out by vertical output lines VSIG1 to VSIGn, and the electric signals are accumulated in an adding circuit 221. The electric signals that have accumulated in the adding circuit 221 are read out successively and scanned by a horizontal shift register 222, and the signals are output in a time series.

The image sensor 16 is driven by a driving circuit 17 controlled by the microcomputer 14 and outputs a sensed image signal to a CDS•AGC•A/D converting circuit 18. Image data from the CDS•AGC•A/D converting circuit 18 is applied to an area-of-interest extracting circuit 20. Under the control of the microcomputer 14, the area-of-interest extracting circuit 20 extracts area-of-interest information relating to a specific image area of interest from the image data acquired from the CDS•AGC•A/D converting circuit 18. The area-of-interest information, which is information concerning the position at which extraction was made, updates the area-of-interest information storage circuit 19 successively via the microcomputer 14.

In order to specify an area of interest initially, use may be made of the output of the image sensor 16. For example, the portion of the output of the image sensor 16 that exhibits motion is detected, this is adopted as a subject of interest and the area of the image that encompasses this subject is adopted as the area of interest. Alternatively, it is possible to investigate the image data that is the output of the image sensor 4 by an area-of-interest recognition circuit 21, and to specify the area of the image data of the subject that has, e.g., specific feature information, as the area of interest. In either case, area-of-interest information specifying the position of the area of interest is expressed by an area of pixels obtained by dividing the entire pixel area of the image, described later.

The position of an area of interest is thus specified. Next, reference will be had to FIG. 2 to describe a MOS image sensor usable as the image sensor 4.

Specifically, in FIG. 2, the vertical shift register 220 outputs control pulses to horizontal output lines connected to pixels belonging to the area of interest, which is the target of partial read-out (random access), among the horizontal output lines VSEL1 to VSELm. The horizontal shift register 222 outputs control pulses to vertical output lines connected to pixels belonging to the area of interest, which is the target of partial read-out, among the vertical output lines VSIG1 to VSIGn.

The electric signals of each of the pixels belonging to the area of interest selected by the control pulses of the horizontal output lines are read out to the adding circuit 221 by the control pulses of the vertical output lines, the electric signals are accumulated in the adding circuit 221 and they are read out successively by the horizontal shift register.

The microcomputer 14 executes overall processing of the overall image sensing apparatus. The microcomputer 14 switches between the ordinary read-out mode and high-speed read-out mode by a mode switch 22 for switching between the ordinary and high-speed read-out modes. If the mode switch 22 has been changed over to the high-speed read-out mode, then, by way of example, area-of-interest information is generated from information, extracted by the area-of-interest extracting circuit 20, of image sensor 16, the generated information is stored in the area-of-interest information storage circuit 19 and the area-of-interest information is updated successively.

When read-out of the entire pixel area is performed in the image sensor 4 in the high-speed read-out mode, the output destination of the CDS•AGC•A/D converting circuit 5 is changed over to the image data storage circuit 7 by the switch 10. At the timing at which partial read-out (random access) is performed, the output destination of the CDS•AGC•A/D converting circuit 5 is changed over to the area-of-interest image data storage circuit 9 by the switch 10. In the ordinary read-out mode, read-out of the entire pixel area is performed at all times and therefore the output destination of the CDS•AGC•A/D converting circuit 5 is kept as the image data storage circuit 7.

When partial read-out (random access) of the area of interest is performed in the image sensor, the area-of-interest information storage circuit 19 receives the area-of-interest information of the subject from the microcomputer 14 and inputs this information to the driving circuit 15 that drives the image sensor 4.

The mode switch 22 for changing over mode between the ordinary and high-speed read-out modes performs the changeover between the ordinary and high-speed read-out modes by controlling the driving circuit 15 through the microcomputer 14. The mode switch 22, which is constituted by a command dial or button, is operated by the user.

The image sensor 16, which is separate from the image sensor 4, is provided in close proximity to the optical system 1 outside the package of the image sensor 4 (not shown). After the output of the image sensor 16 is converted to image data by the CDS•AGC•A/D converting circuit 18, the image data is input to the area-of-interest extracting circuit 20. The information of the image area extracted by the area-of-interest extracting circuit 20 is input to the microcomputer 14.

It should be noted that in the following embodiments an image sensing apparatus adopting a photometry method using an external photometer is described, however, the present invention is not limited to this. An image sensing apparatus adopting a photometry method in which a light beam of an image entered through a single optical system is split into two beams and photometry is performed using one of the split light beams may be utilized.

The image sensor 16 monitors the overall image data at all times. For example, the image sensor 16 may constantly monitor the entirety of the image data at regular intervals, such as one time per several frames, or may be operated only when there is motion of some kind in the image data.

It should be noted that if the image sensor 16 is one that is specialized for detection of motion, then any image sensor is usable. For example, it is permissible to use an image sensor of the kind that senses infrared radiation, or an image sensor that operates on the basis of temperature. Accordingly, the number of sensors need not be large. The image sensor for infrared is preferred in view of the fact that it is not much affected by the brightness of the optical image formed and because robust detection is possible. An example in which an image sensor for infrared is used for the image sensor 16 will be described in embodiments.

First Embodiment

Figure 3:
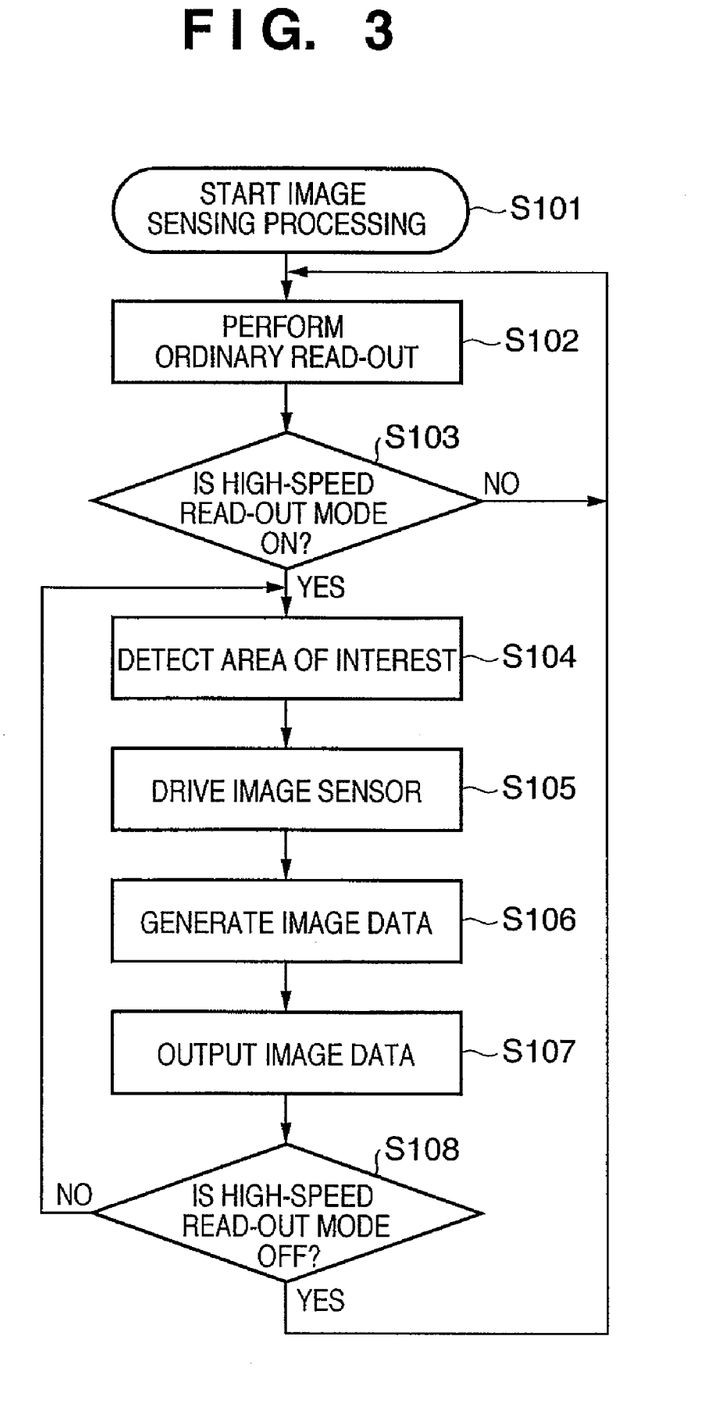
FIG. 3 is a flowchart illustrating the flow of processing for controlling read-out of the image sensor in the image sensing apparatus according to the first embodiment.
Figure 4:
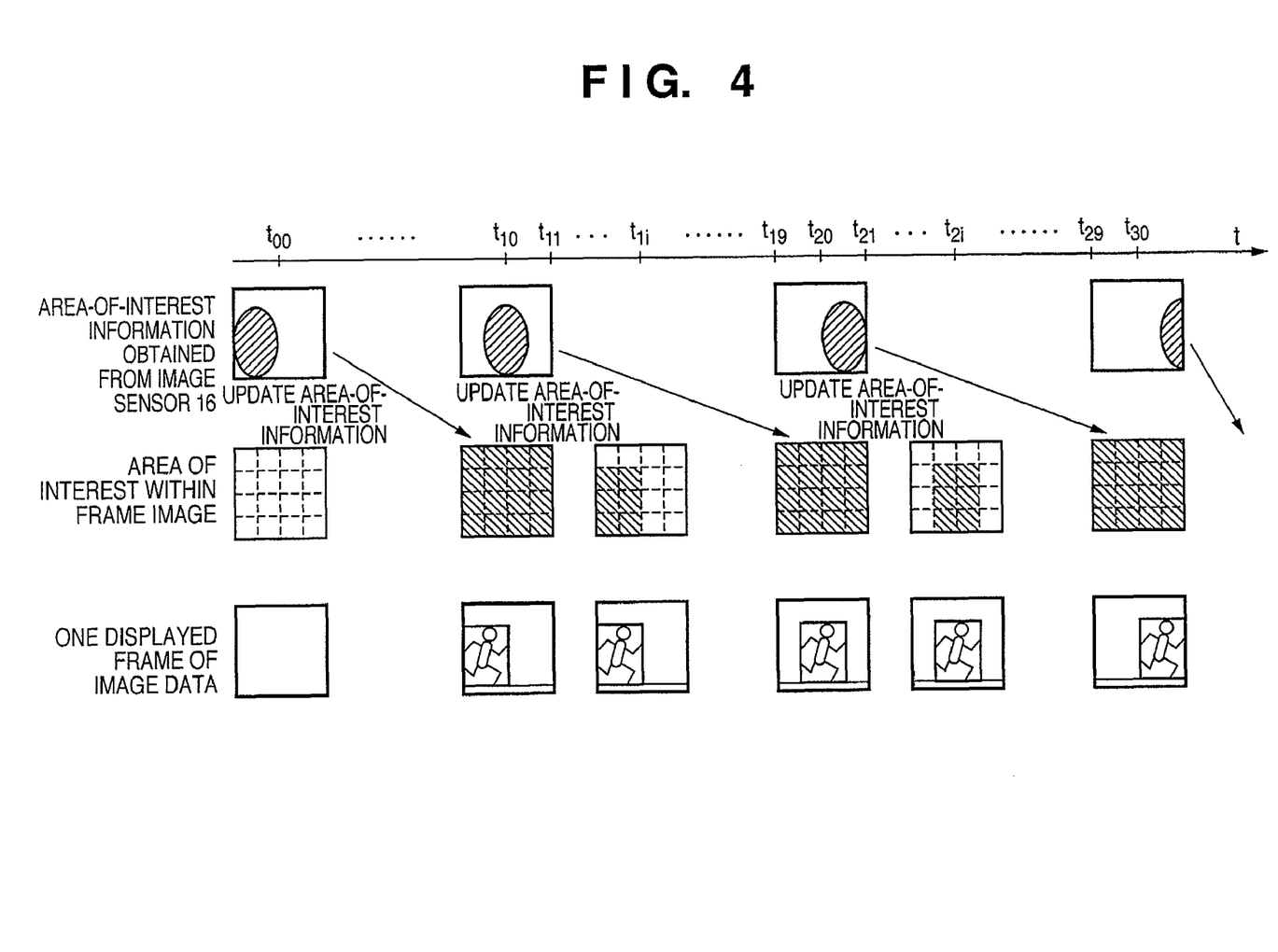
FIG. 4 is a conceptual view illustrating delay time in read-out of the image sensor in the image sensing apparatus according to the first embodiment.
Figure 5:
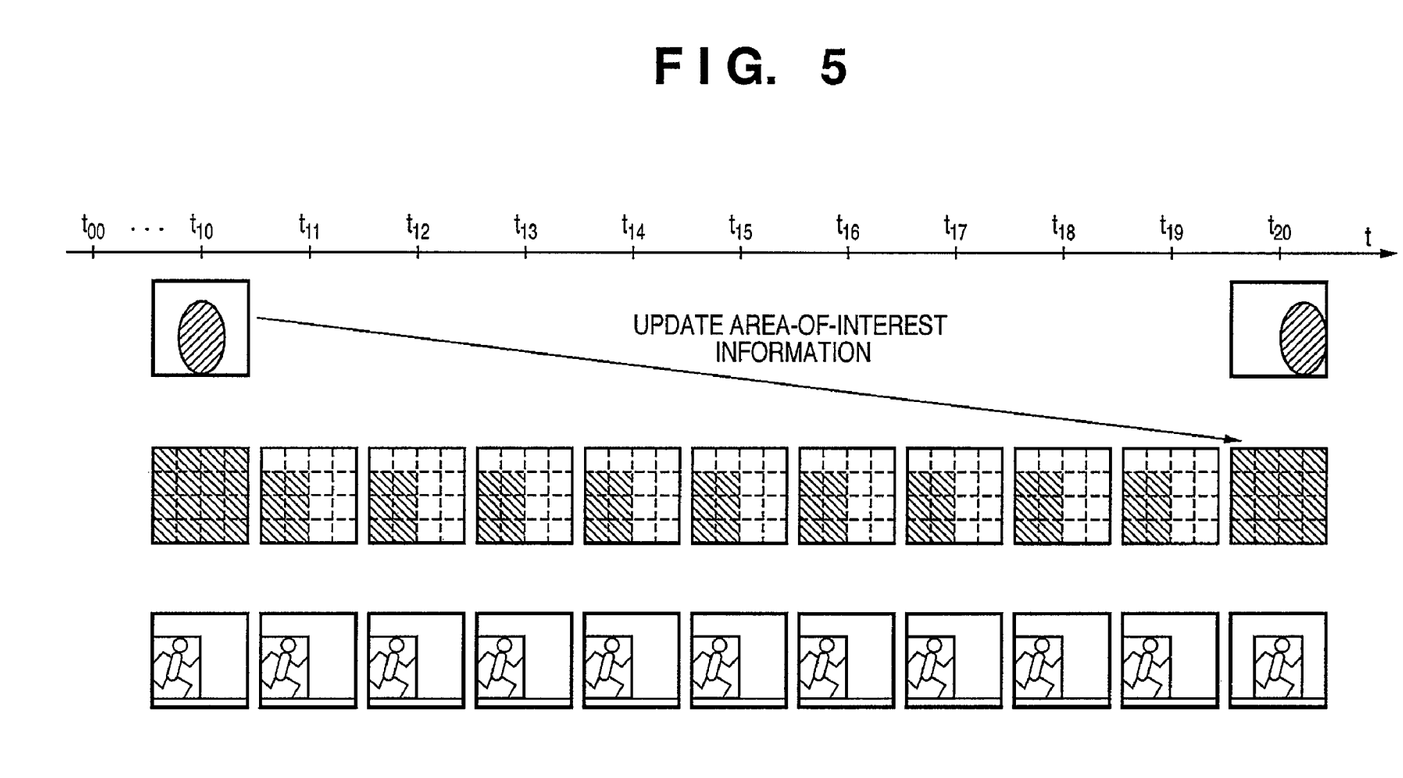
FIG. 5 is a conceptual view illustrating timing at which subject-detection information is reflected in read-out of the image sensor according to the first embodiment.

Next, reference will be had to FIGS. 3 to 5 to describe a method of controlling an image sensor in an image sensing apparatus according to a first embodiment of the present invention. FIG. 3 is a flowchart illustrating the flow of processing for controlling read-out of an image sensor 4 in the image sensing apparatus according to the first embodiment, FIG. 4 is a conceptual view illustrating delay time in read-out of the image sensor 4, and FIG. 5 is a conceptual view illustrating timing at which subject-detection information is reflected in read-out of the image sensor 4.

FIG. 4 will be described first. Image data obtained from the image sensor 16 is shown in a time series at the top of FIG. 4. The stripe-patterned portion is a specific subject area detected as the subject. An area of interest within one frame of the image data is shown in a time series at the middle of FIG. 4.

For example, the area of one frame of the image data is divided into 16 areas in a 4×4 array. Each resulting area is formed from a plurality of pixels. Read-out of the image sensor 4 is performed based upon the area of interest of this subject. In the image sensor 4, the entire pixel area of the frame image (all of the divided 16 areas are hatched by a stripe pattern) is read out in the case of entire-pixel-area read-out, and the area of interest (part of the divided 16 areas are hatched by a stripe pattern), which is the area of the subject to be read out, is read out in the case of partial read-out (random access). The image sensor 4 is not driven for the area which are not hatched by a stripe pattern in FIG. 4.

Finally, the combined frame image displayed on the display unit 13 is shown in a time series at the bottom of FIG. 4. The image data is one frame of image data that has been output from the image data storage circuit 7 in case of read-out of the entire pixel area in image sensor 4. On the other hand, in case of partial read-out (random access) of the area of interest, the image data is one frame of image data, which is the result combining of images, output from the image data combining circuit 8 in which the background image data is combined with the other image data at a prescribed position thereof.

In FIG. 4, assume that the image sensor 4 operates at 60 frames/sec in the ordinary read-out mode and at 600 frames/sec in the high-speed read-out mode. Further, the image sensor 16 for monitoring image data always operates in the ordinary read-out mode (60 frames/sec in this case).

In FIG. 4, the interval of t00, t10, t20, t30 . . . along the time series t represents 60 frames/sec, and the interval of t1i, t2i, (0<i<9) represents 600 frames/second. Accordingly, from t10 to t20, 10 frames of image data are output from the image sensor 4. The three types of image data at t11, t19, t21, t29 are not illustrated (see FIG. 5 for the details).

According to this embodiment, read-out of all pixels is performed unconditionally, with the exception of the initial frame (t00), by the image sensor 4 in order to update the background image data at the interval (60 frames/sec) of the ordinary read-out mode. At times other than when read-out is performed in the ordinary read-out mode, the data in the image area of the subject is read out (FIG. 5) in the high-speed read-out mode (600 frames/sec). It should be noted that at t00, a delay occurs because the image area of the subject extracted from the image sensor 16 is reflected in the image sensor 4 in real-time. Therefore, the image sensor 4 is not operated and, hence, a displayed frame of image data does not exist.

Accordingly, in this embodiment, when area-of-interest information, which is information of detection of the subject, is updated, as illustrated in FIG. 5, a delay of one frame occurs at the interval of 60 frames/sec in the ordinary read-out mode.

Next, the operation of the image sensing apparatus will be described in accordance with the flowchart of FIG. 3 showing the flow of processing for controlling read-out of the image sensor 4. At step S101, the image sensing apparatus accepts information specifying introduction of power. The image sensing apparatus performs a prescribed operation such as initialization in response to the information specifying introduction of power. That is, the optical system 1 forms the optical image of the subject on the image sensor 4.

The image sensor 4 generates electric charge, which conforms to the optical image formed, and output as an electric signal (analog signal). The CDS•AGC•A/D converting circuit 5 applies CDS processing to the analog electric signal, amplifies the signal, which has undergone CDS processing, by an AGC operation and converts the analog electric signal to digital data (a digital signal). The image data processor 6 receives the image data and processes the image data based upon a control signal received from the microcomputer 14.

The image sensing apparatus starts ordinary read-out at step S102. That is, the microcomputer 14 controls the driving circuit 15 and performs ordinary read-out of the image sensor 4. The analog electric signal that has been output from the image sensor 4 is subjected to prescribed processing by the CDS•AGC•A/D converting circuit 5 and is input to the image data processor 6 as image data.

The microcomputer 14 changes over the output destination of the image data of the CDS•AGC•A/D converting circuit 5 to the image data storage circuit 7 by changing over the switch 10. The image data (frame image data) that has been output is subjected to prescribed image processing by the image data processing circuit 11 via the image data storage circuit 7, after which the processed image data is displayed on the display unit 13. The processed image data is further stored on a removable recording medium by the recording circuit 12.

Basically the image data storage circuit 7 stores one frame of image data, which has been obtained from the CDS•AGC•A/D converting circuit 5, when the image sensor 4 undergoes read-out of the entire pixel area. At this step, however, the function of this circuit is not used.

At step S103, it is determined whether the high-speed read-out mode has been selected. That is, the microcomputer 14 determines whether a signal to start the high-speed read-out mode has been received from the mode switch 22 that switches between the ordinary and high-speed read-out modes.

If the high-speed read-out mode has been selected, then the microcomputer 14 connects the area-of-interest information storage circuit 19 and advances processing to step S104. If the signal to start the high-speed read-out mode has not been received, the processing is returned to ordinary read-out at step S102.

The image sensor (infrared image sensor) 16 starts extraction of the area of interest of the subject (see "AREA-OF-INTEREST INFORMATION OBTAINED FROM IMAGE SENSOR 16" at the top of FIG. 4) at step S104. That is, the area of interest of the subject extracted from the output of the image sensor 16 is mapped to the area of interest of a certain subject as information concerning the location at which the image sensor 4 is driven. As a result, the area of interest is associated with the pixel areas divided into 16 areas and is stored in the area-of-interest information storage circuit 19 as area-of-interest information (see "AREA OF INTEREST WITHIN FRAME IMAGE" at the middle of FIG. 4). In this embodiment, the image sensor 16 is operated in the ordinary read-out mode (60 frames/sec), as mentioned earlier.

At step S105, the image sensor 4 is driven based upon the area-of-interest information obtained at step S104. That is, in a case where all pixels are read out by the image sensor 4 in order to generate image data to serve as background (t10, t20, t30 . . . in FIG. 4), the output destination of the CDS•AGC•A/D converting circuit 5 is changed over to the image data storage circuit 7.

Further, in a case where partial read-out (random access) is performed by the image sensor 4 [t11, t2$i$, (1<i<9) in FIG. 4], the output destination of the CDS•AGC•A/D converting circuit 5 is changed over to the area-of-interest image data storage circuit 9 by the switch 10.

At step S106, data is generated as frame image data, which is capable of being displayed on the display unit 13, based upon the image data that has been output at step S105. That is, assume that read-out of all pixels has been performed at step S105. In this case (t10, t20, t30 . . . in FIG. 4), the image data that has been output from the CDS•AGC•A/D converting circuit 5 is already one frame of image data and therefore the image data is input to the image data processing circuit 11 as is without being processed.

Next, assume that partial read-out (random access) has been performed by the image sensor 4. In this case (tli, t2$i$, (0<i<9 . . . in FIG. 4), the image data that has been output from the CDS•AGC•A/D converting circuit 5 is image data solely of the extracted area of interest of the subject, and hence one frame of image data cannot be generated. In order to generate one frame of image data, therefore, one frame of image data that has been stored in the image data storage circuit 7 is input to the image data combining circuit 8.

The image data combining circuit 8 performs a combining operation by adopting the frame image data, which has been stored in the image data storage circuit 7, as a background image and fitting the area-of-interest image data, which has been stored in the area-of-interest image data storage circuit 9, in the background image at the appropriate location thereof, thereby generating one frame of image data. The one frame of image data thus synthesized is input to the image data processing circuit 11.

At step S107, the frame data generated at step S106 is displayed on the display unit 13 (see "ONE DISPLAYED FRAME OF IMAGE DATA" at the bottom of FIG. 4). That is, the one frame of synthesized image data that has been subjected to prescribed image processing by the image data processing circuit 11 is output to the display unit 13.

At step S108, the microcomputer 14 determines whether a signal ending the high-speed read-out mode has been received from the ordinary/high-speed read-out changeover mode switch 22. In a case where a signal ending the high-speed read-out mode has been received, control returns to step S102 and a transition is made to the ordinary read-out mode.

In a case where a signal ending the high-speed read-out mode has not been received, control returns to step S104, detection of the area of interest of a subject is performed and steps S104 to S108 are repeated until the end signal is received. Image data of the area of interest that is updated successively is small in size and the amount of information is suppressed. As a result, the time needed for image processing is curtailed.

In accordance with the first embodiment of the present invention described above, it is possible to provide an image sensing apparatus in which both high spatial resolution and an excellent real-time property are achieved within the limits of processing performance of an image sensor that is capable of high-speed read-out based upon recognition of an area of interest by the image sensor.

Second Embodiment

Figure 6:
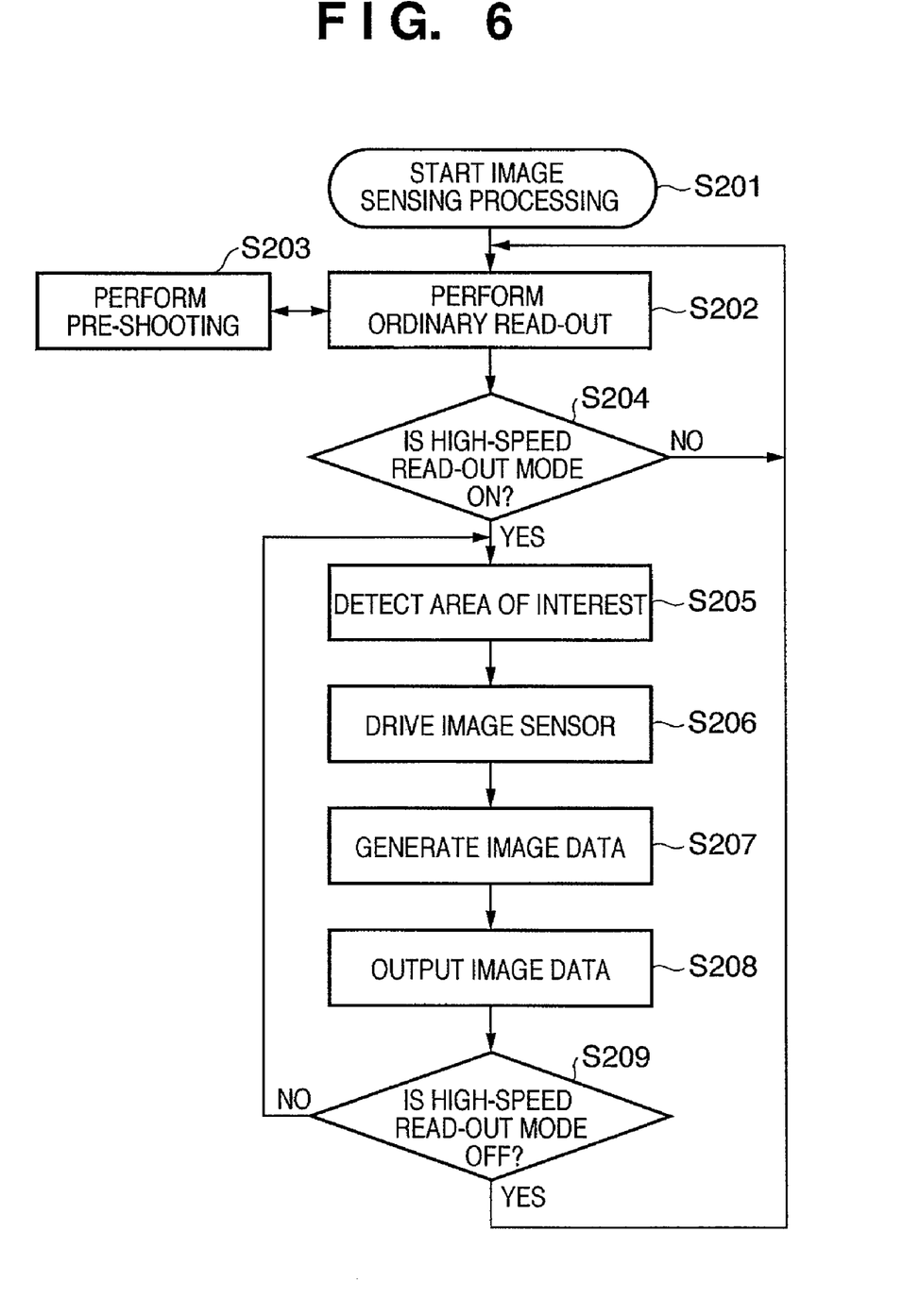
FIG. 6 is a flowchart illustrating the flow of processing for controlling read-out of the image sensor in the image sensing apparatus according to the second embodiment.
Figure 7:
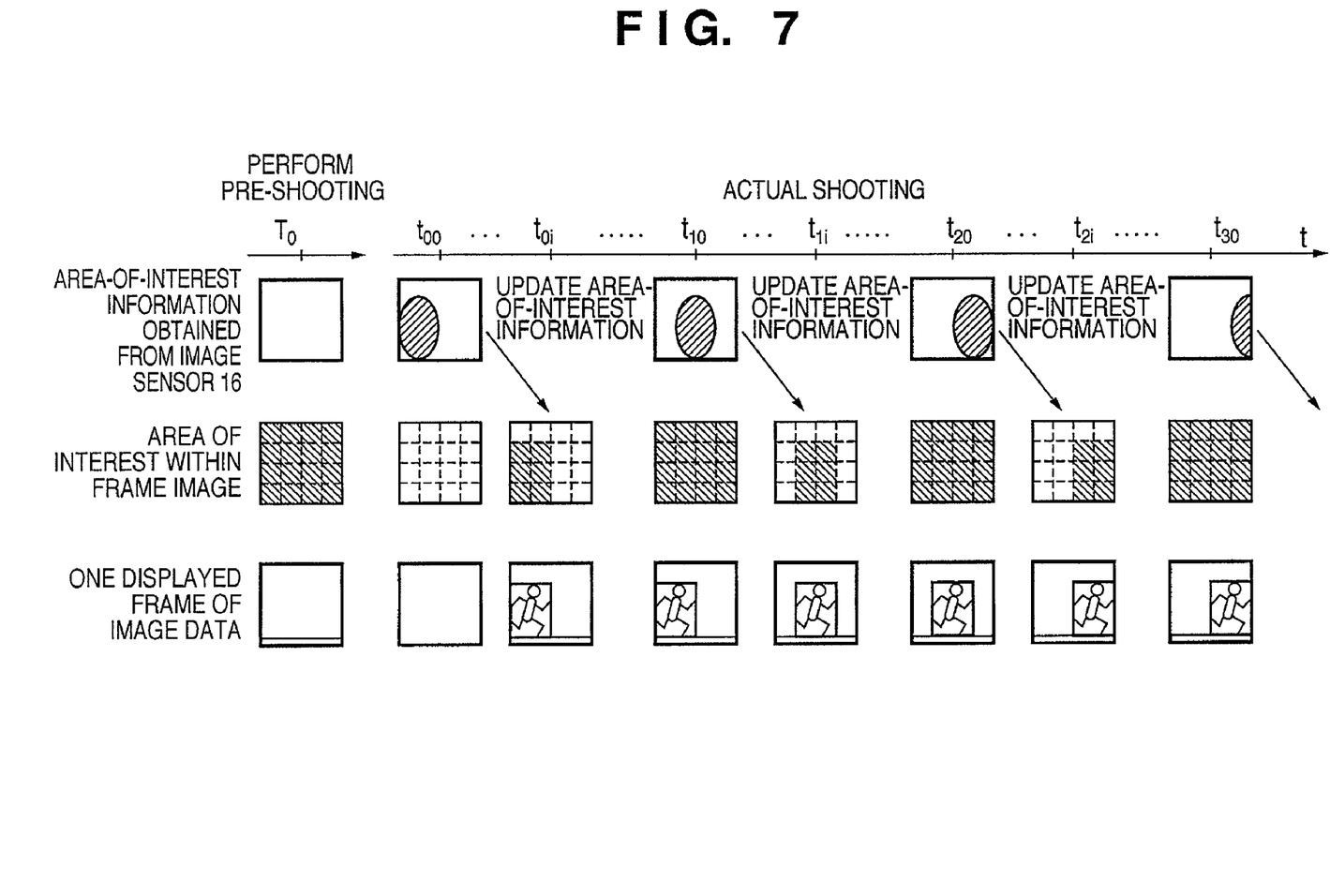
FIG. 7 is a conceptual view illustrating delay time in read-out of the image sensor in the image sensing apparatus according to the second embodiment.
Figure 8:
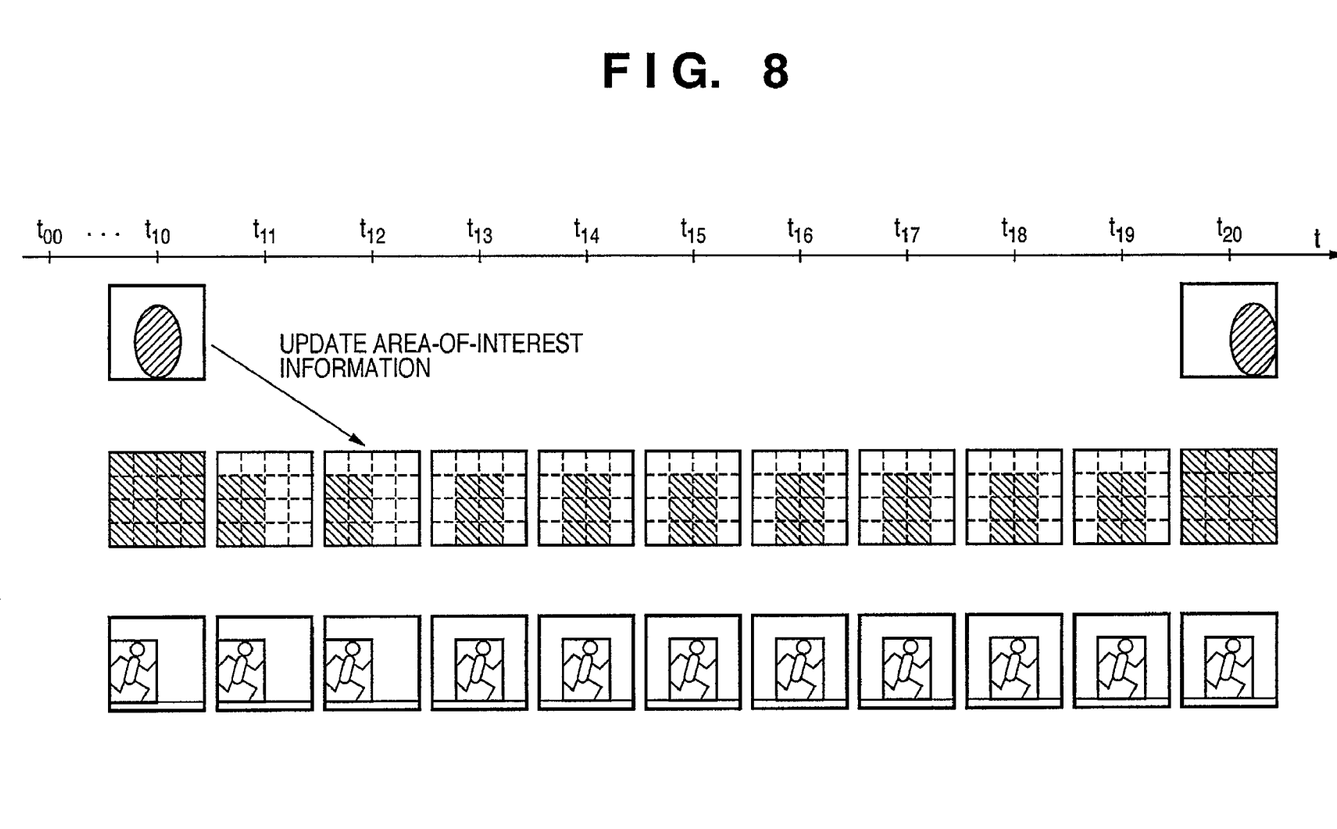
FIG. 8 is a conceptual view illustrating timing at which area-of-interest information of a subject is reflected in read-out of the image sensor according to the second embodiment.

Reference will now be had to FIGS. 6 to 8 to describe a method of controlling an image sensing apparatus according to a second embodiment of the present invention. FIG. 6 is a flowchart illustrating the flow of processing for controlling read-out of the image sensor 4 in the image sensing apparatus, FIG. 7 is a conceptual view illustrating delay time in read-out of the image sensor 4, and FIG. 8 is a conceptual view illustrating timing at which area-of-interest information of a subject is reflected in read-out of the image sensor 4.

For the structural views of the image sensing apparatus according to the second embodiment of the invention, reference may be had to FIGS. 1 and 2 and these need not be described again. Further, components similar to those of the first embodiment need not be described again. The description that follows will focus on portions that differ from those of the first embodiment.

The second embodiment differs from the first embodiment in that "pre-shooting" is performed in order to generate image data that will serve as background, and the image data to serve as background is prepared in advance. As a result, updating of area-of-interest information from the image sensor 16 can be executed at the interval (600 frames/sec) of the high-speed read-out mode rather than at the interval (60 frames/sec) of the ordinary read-out mode. This makes it possible to improve high-speed tracking and to exploit the advantages of high-speed read-out.

The second embodiment will be described with reference to FIGS. 7 and 8. The basic operation is similar to that of the first embodiment described in conjunction with FIGS. 4 and 5. In the second embodiment, the shooting operation is divided into "pre-shooting" and "actual shooting", described later. In FIG. 7, T0 of the T time series shown at the left corresponds to "pre-shooting". Further, t00, t10, t20, t30, . . . of the t time series shown on the right correspond to "actual shooting".

In a manner similar to the first embodiment, the second embodiment also is such that read-out of all pixels from the image sensor 4 is performed unconditionally in order to update the image data that will serve as background at the interval (60 frames/sec) of the ordinary read-out mode of image sensor 4. Further, in the first embodiment, when area-of-interest information of the subject, which is extracted information representing the subject, is updated, a delay equivalent to one frame occurs and the interval becomes 60 frames/sec of the ordinary read-out mode.

In this embodiment, however, background image data is acquired in advance by "pre-shooting". As a result, the amount of delay produced when the area-of-interest information of the subject is updated is small (the time required is only the physical time between detection of motion of the subject and arrival of the area-of-interest information, which is required to drive the image sensor 4, at the driving circuit 15).

In other words, if motion of the subject has been detected, it is possible to update the area-of-interest information of the subject without waiting for next timing for unconditional entire-pixel-area read-out performed after the detection. That is, if motion of the subject is detected at any of times t0$i$, t1$i$, t2$i$, t3$i$ . . . , updating of the area-of-interest information of the subject is possible in time 0<$i$<9 (see FIG. 7).

Next, operation of the image sensing apparatus will be described in accordance with the flowchart of FIG. 6 illustrating processing for controlling read-out of the image sensor 4 in the image sensing apparatus. Since the details of processing are similar to the processing of the first embodiment, only the difference will be described.

At step S201, the image sensing apparatus accepts information specifying introduction of power. The image sensing apparatus performs a prescribed operation such as initialization in response to the information specifying introduction of power.

The image sensing apparatus starts ordinary read-out of the image sensor 4 at step S202. The "pre-shooting" mentioned earlier is performed at this stage. That is, when "pre-shooting" is performed by the image sensor 4 at step S203, the image data storage circuit 7 stores the background image data (T0 in FIG. 7) necessary in the high-speed read-out mode.

At step S204, it is determined whether the high-speed read-out mode has been selected by the mode switch 22. If the high-speed read-out mode has been selected, then the microcomputer 14 connects the image data storage circuit 7 and the area-of-interest information storage circuit 19 and advances processing to step S205. If the signal to start the high-speed read-out mode has not been received, processing returns to step S202.

At step S205, the image sensor (infrared image sensor) 16 starts extraction of the area of interest of the subject (see "AREA-OF-INTEREST INFORMATION OBTAINED FROM IMAGE SENSOR 16" at the top of FIG. 7). Here the image sensing apparatus starts "actual shooting".

At step S206, the image sensor 4 is driven based upon the area-of-interest information obtained at step S205 and stored in the area-of-interest information storage circuit 19.

At step S207, one frame of image data displayable by the display unit 13 is generated by the combining operation in the image data combining circuit 8 based upon the image data that has been read out at step S206.

At step S208, the one frame of image data generated at step S207 is displayed on the display unit 13 (see "ONE DISPLAYED FRAME OF IMAGE DATA" at the bottom of FIG. 7).

At step S209, the microcomputer 14 determines whether a signal ending the high-speed read-out mode has been received from the mode switch 22. In a case where a signal ending the high-speed read-out mode has been received, control returns to step S202 and a transition is made to the ordinary read-out mode. In a case where a signal ending the high-speed read-out mode has not been received, control returns to step S205, extraction of the area of interest of a subject is performed and steps S205 to S209 are repeated until the end signal is received.

In accordance with the second embodiment, updating of area-of-interest information from the image sensor 16 is executed at the interval (600 frames/sec) of the high-speed read-out mode rather than at the interval (60 frames/sec) of the ordinary read-out mode, unlike the first embodiment. Further, if the image sensor 16 is caused to operate at an interval shorter than the read-out interval of the ordinary read-out mode, then the amount of delay from extraction of the area of interest of the subject to read-out of the image sensor 4 is reduced further and it is possible to perform read-out at a speed close to real-time.

Other Embodiments

The present invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-067595, filed on Mar. 15, 2007, which is hereby incorporated by reference herein in its entirety.

What is claimed is:

1. An image sensing apparatus having first and second image sensors, comprising:
   an optical system configured to form an optical image on the first and second image sensors;
   an area-of-interest extracting unit configured to extract an area of interest from image data that is output by the second image sensor;
   a first storage unit configured to store image data that is read out from an entire pixel area of the first image sensor at a first time interval;
   a second storage unit configured to store image data obtained by reading out only partial area of the first image sensor corresponding to the position of the area of interest at a second time interval shorter than the first time interval; and
   a combining unit configured to combine the image data that has been stored in said first storage unit and the image data that has been stored in said second storage unit to thereby generate combined image data.

2. The apparatus according to claim 1, wherein by the time said first storage unit stores the next image data read out from the entire pixel area of the first image sensor, said combining unit combines the image data that has been stored in said first storage unit and the image data that has been stored in said second storage unit to thereby generate the combined image data.

3. The apparatus according to claim 1, wherein the first image sensor is a randomly accessible image sensor.

4. An image sensing method of an image sensing apparatus having first and second image sensors and an optical system for forming an optical image on the first and second image sensors, said method comprising:
   an area-of-interest extracting step of extracting an area of interest from image data that is output by the second image sensor;
   a first storage step of storing image data, which is read out from an entire pixel area of the first image sensor at a first time interval, in a first storage unit;
   a second storage step of storing image data in a second storage unit, the image data being obtained by reading out only partial area of the first image sensor corresponding to the position of the area of interest at a second time interval shorter than the first time interval; and
   a combining step of combining the image data that has been stored in the first storage unit and the image data that has been stored in the second storage unit to thereby generate combined image data.

5. A computer-readable storage medium storing a program for causing a computer to execute the steps of the image sensing method set forth in claim 4.

* * * * *